United States Patent
Sun et al.

(10) Patent No.: US 6,915,589 B2
(45) Date of Patent: Jul. 12, 2005

(54) SENSOR POSITIONING SYSTEMS AND METHODS

(75) Inventors: Mei H. Sun, Los Altos, CA (US); Richard Schwaninger, Pleasanton, CA (US); Wayne G. Renken, San Jose, CA (US)

(73) Assignee: SensArray Corporation, Fremont, CA (US)

( * ) Notice: Subject to any disclaimer, the term of this patent is extended or adjusted under 35 U.S.C. 154(b) by 0 days.

(21) Appl. No.: 10/688,300

(22) Filed: Oct. 16, 2003

(65) Prior Publication Data

US 2005/0081398 A1 Apr. 21, 2005

(51) Int. Cl.⁷ .............................................. G01D 21/00
(52) U.S. Cl. ............................ 33/645; 33/613; 33/562; 33/566
(58) Field of Search .................. 33/645, 613, 561–563, 33/566, 1 G, 551

(56) References Cited

U.S. PATENT DOCUMENTS

| | | | | |
|---|---|---|---|---|
| 4,455,749 A | * | 6/1984 | Hayward ..................... 33/1 B |
| 4,584,780 A | * | 4/1986 | Pressey ....................... 33/563 |
| 4,964,737 A | | 10/1990 | Baker et al. | |
| 5,363,561 A | * | 11/1994 | Essary ......................... 33/562 |
| 5,548,372 A | * | 8/1996 | Schroeder et al. ............ 355/53 |
| 5,855,076 A | * | 1/1999 | Warner, Jr. et al. .......... 33/562 |
| 6,079,875 A | * | 6/2000 | Klass et al. ................. 374/130 |
| 6,214,525 B1 | * | 4/2001 | Boyko et al. ............... 430/313 |
| 6,325,536 B1 | | 12/2001 | Renken et al. | |
| 6,555,408 B1 | | 4/2003 | Jacobsen et al. | |
| 6,687,987 B2 | * | 2/2004 | Mayer et al. ................. 29/832 |
| 6,751,493 B2 | * | 6/2004 | Wenger ....................... 600/382 |

* cited by examiner

Primary Examiner—Christopher W. Fulton
Assistant Examiner—Yaritza Guadalupe
(74) Attorney, Agent, or Firm—Parsons Hsue & de Runtz LLP

(57) ABSTRACT

Multiple sensors may be attached to a substrate to measure conditions at different points. Positioning the sensors accurately may be achieved using a template to establish sensor position. A pre-fabricated kit including a template, sensors and a cable assembly may be easily transported so that sensors may be attached in the field.

27 Claims, 10 Drawing Sheets

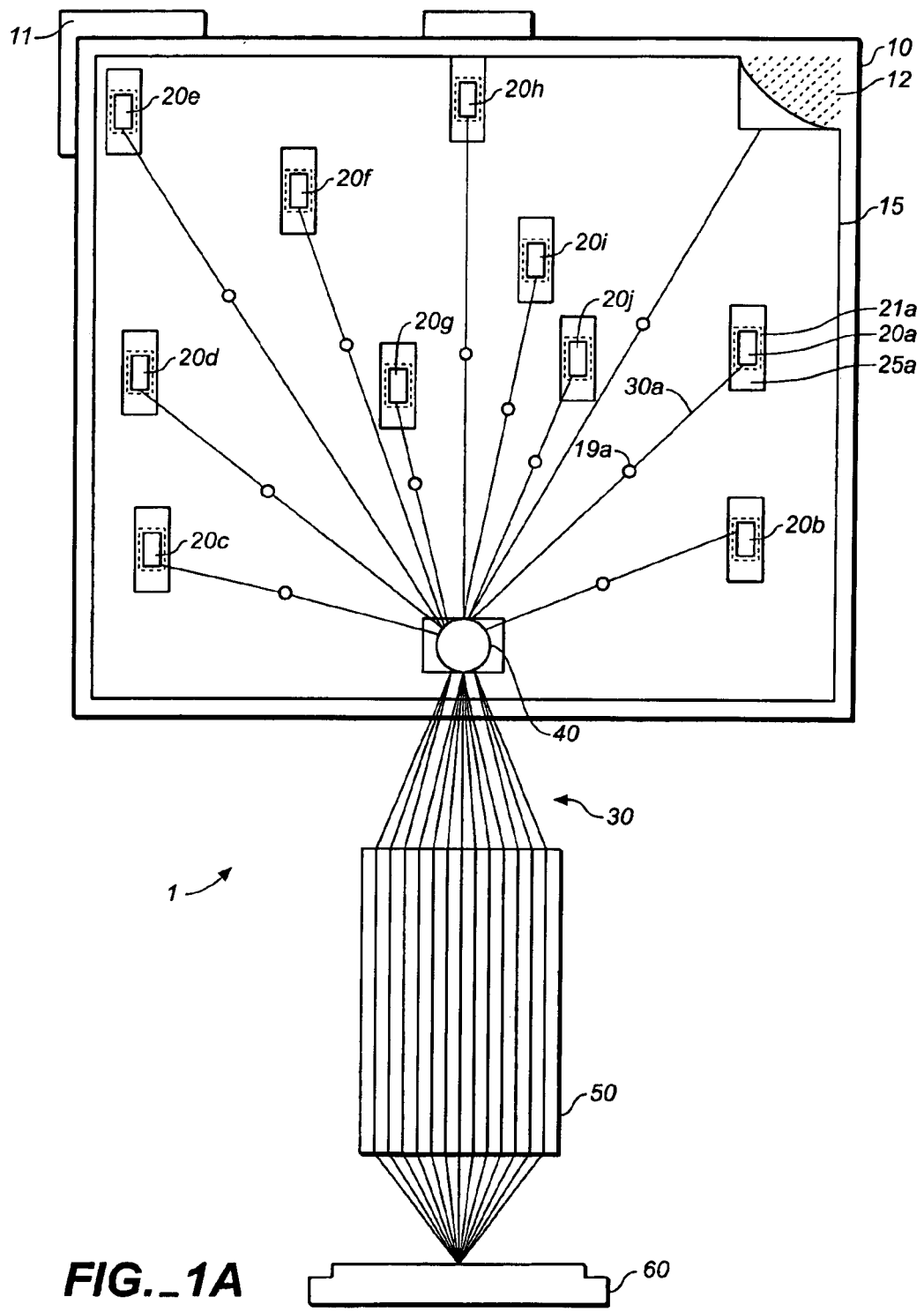
FIG._1A

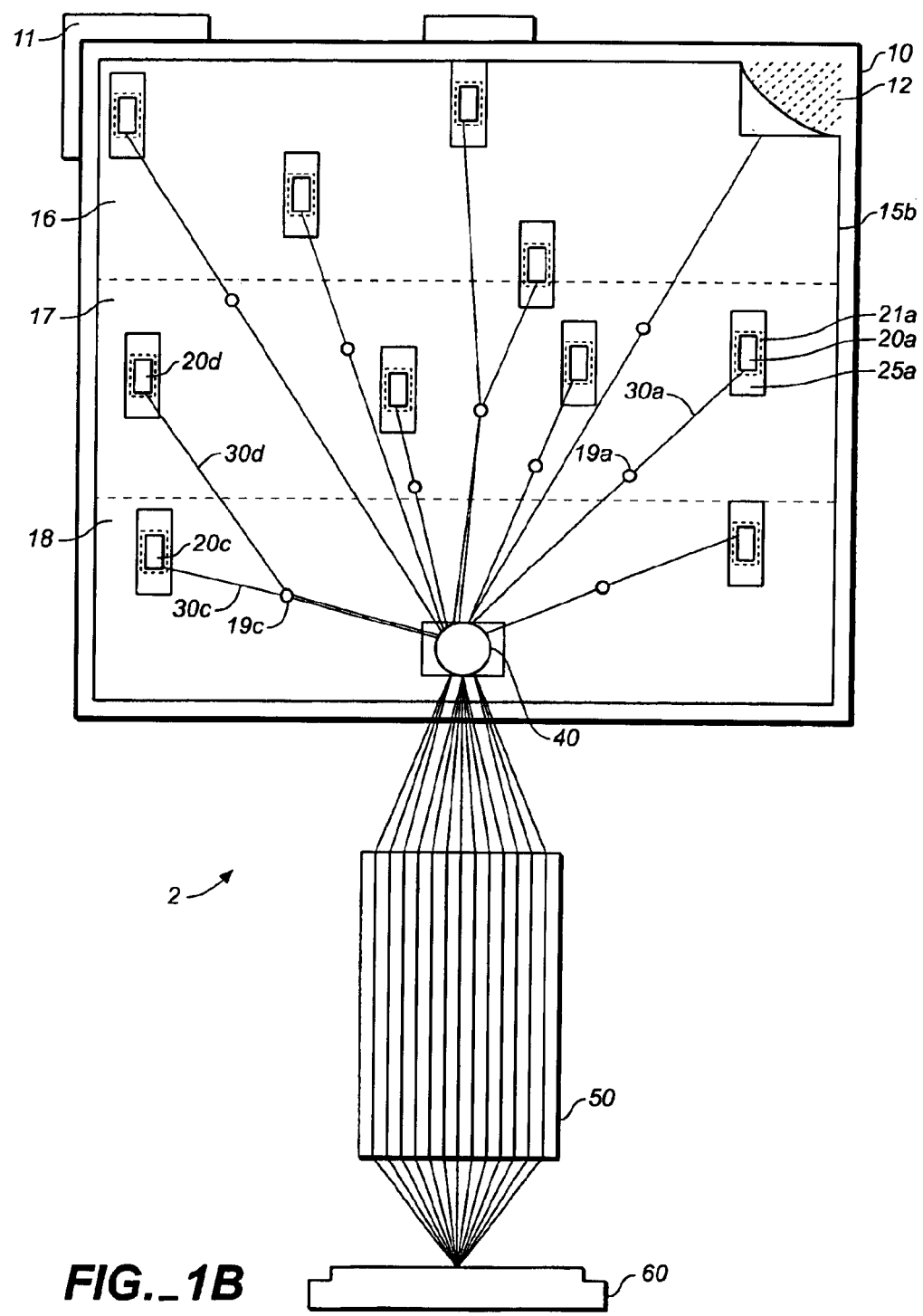
FIG._1B

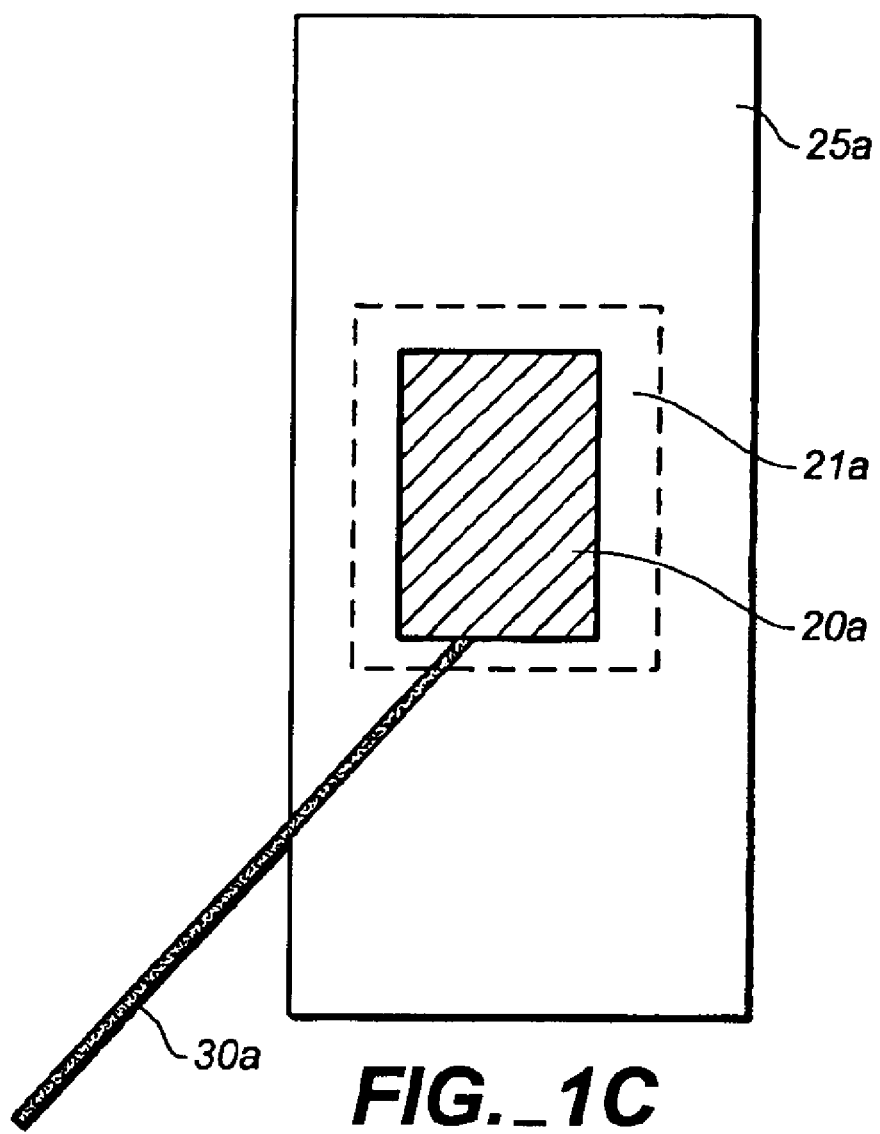
FIG._1C

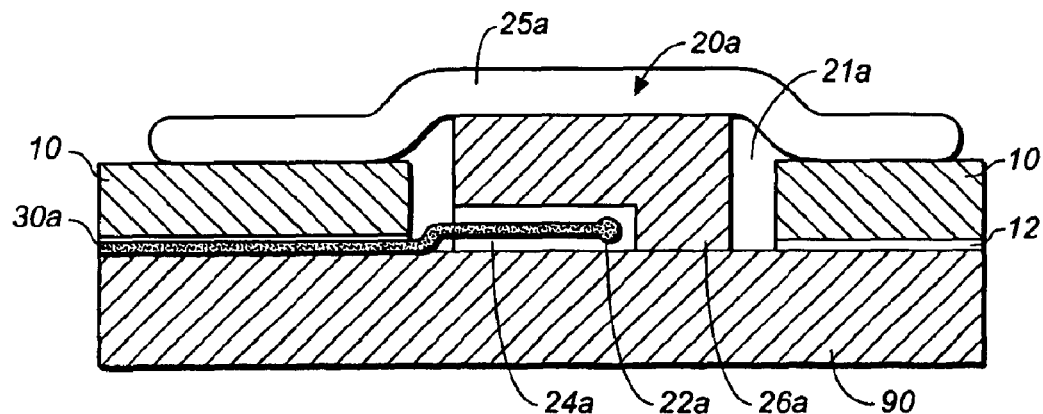
FIG._2A
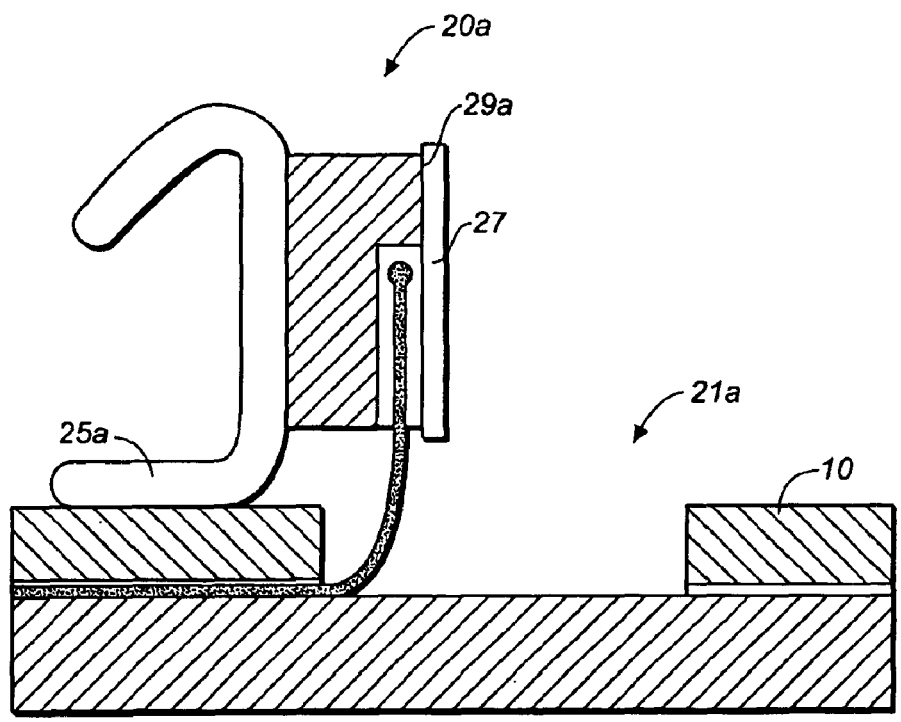
FIG._2B

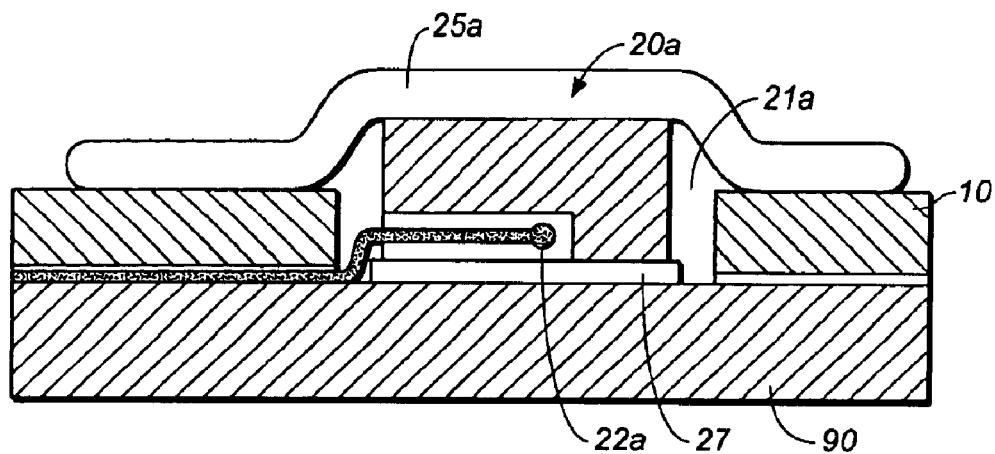
FIG._2C
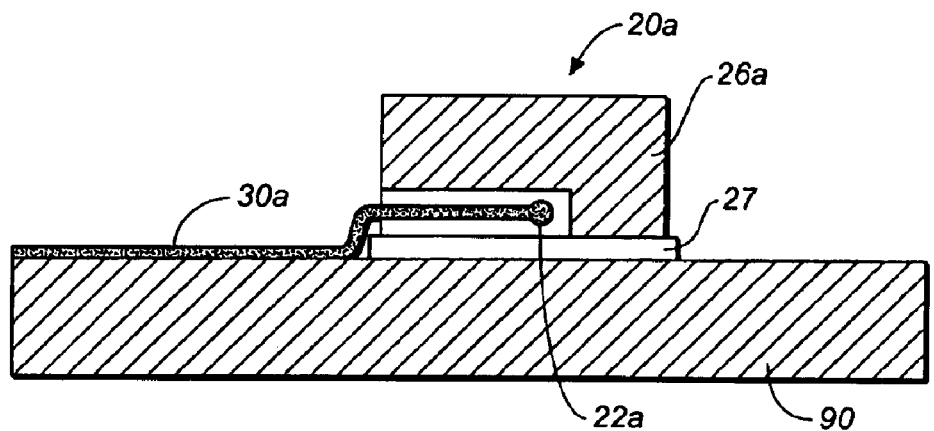
FIG._2D

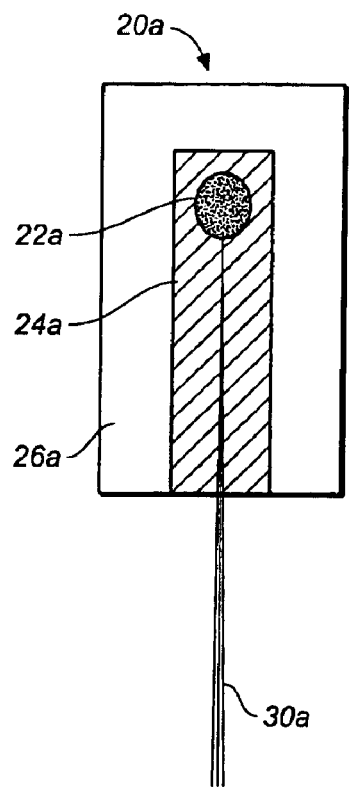
FIG._3A
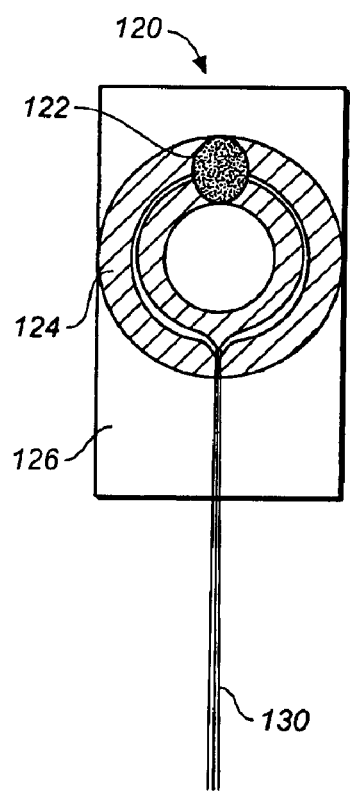
FIG._3B
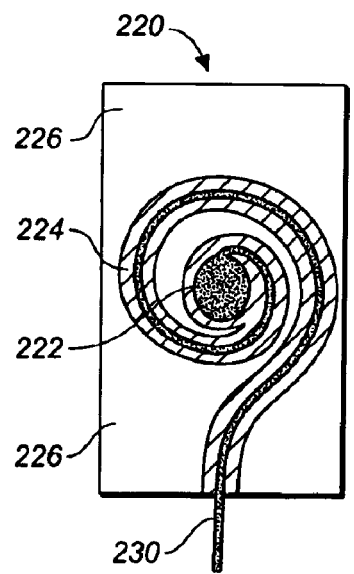
FIG._3C

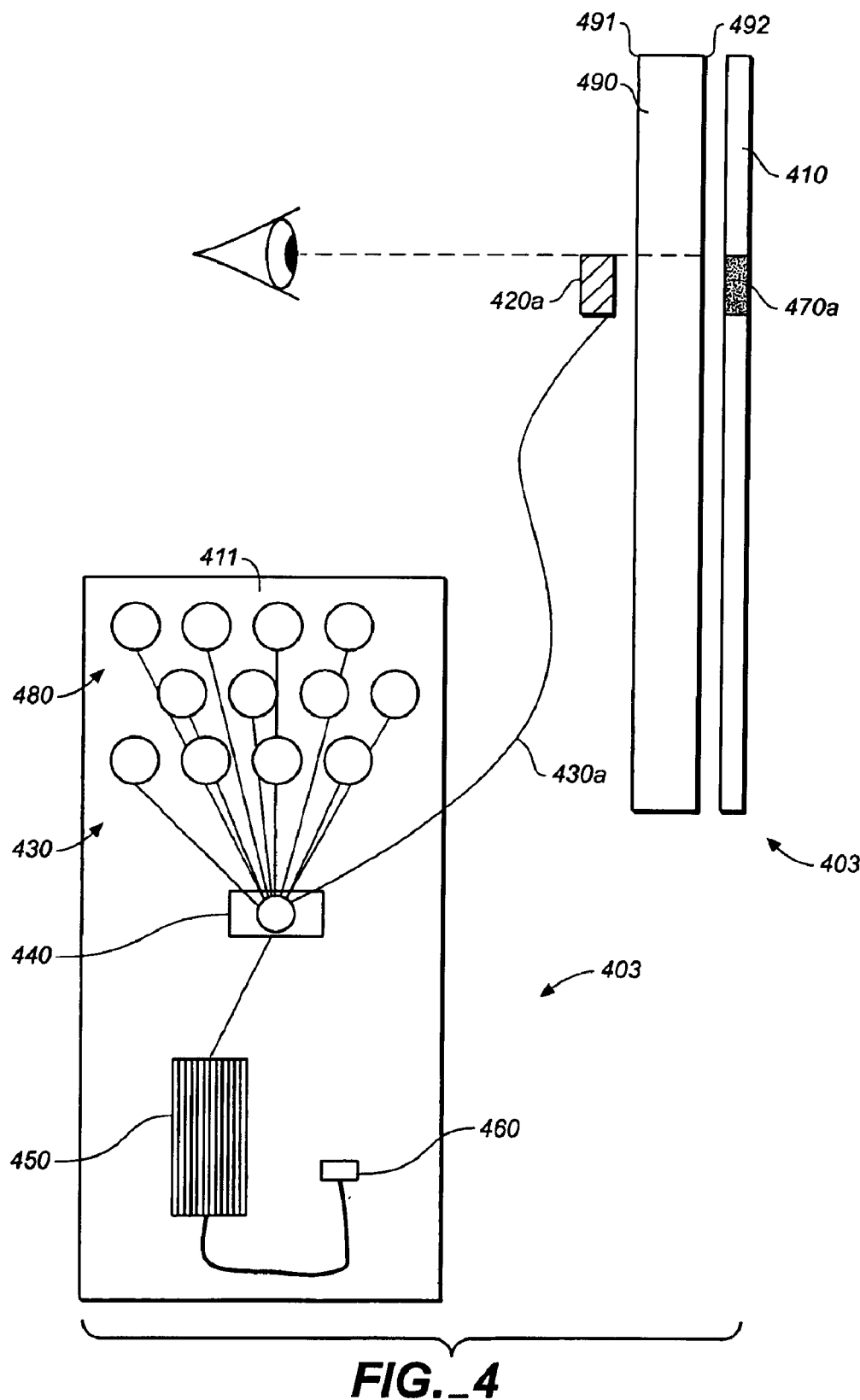
FIG._4

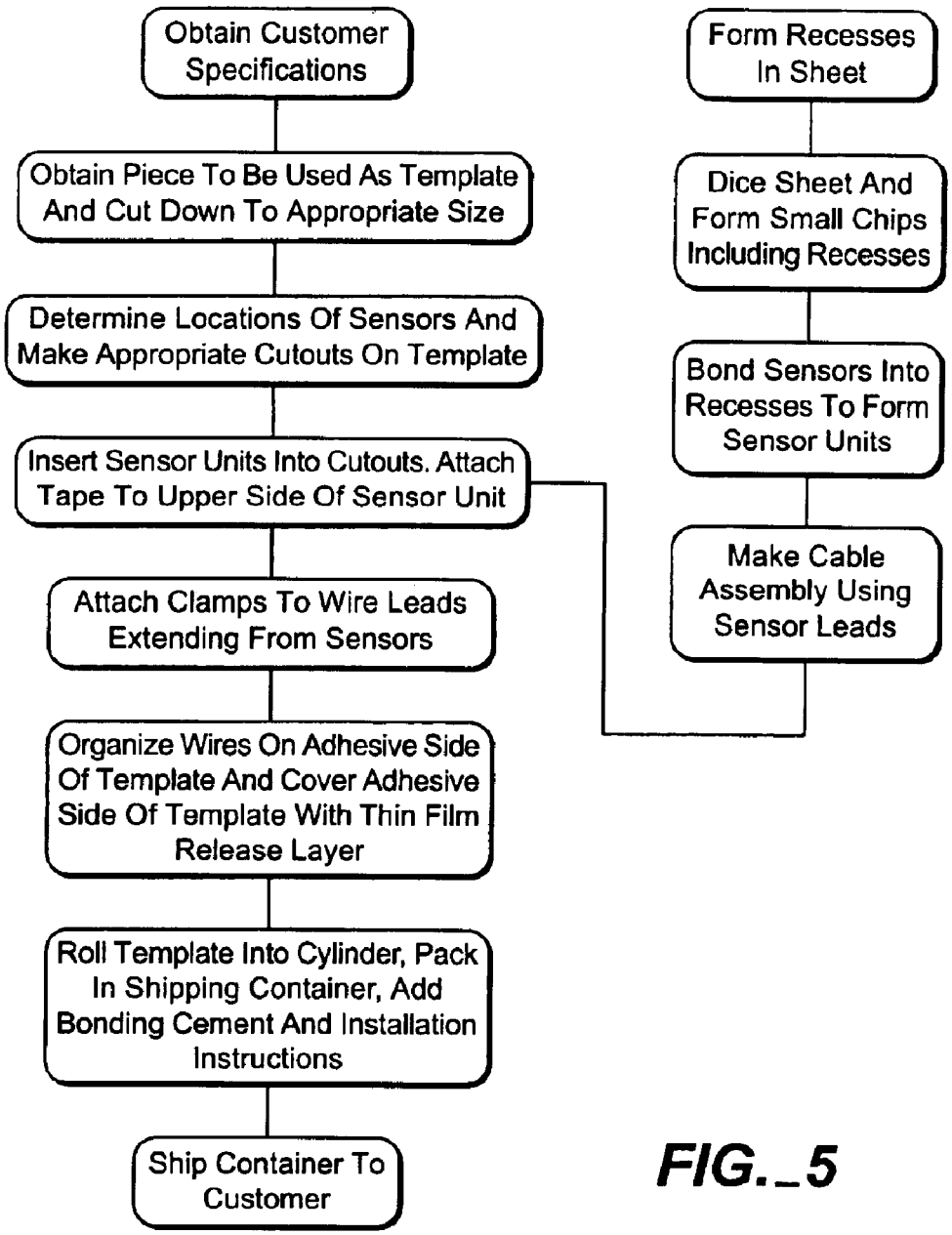
FIG._5

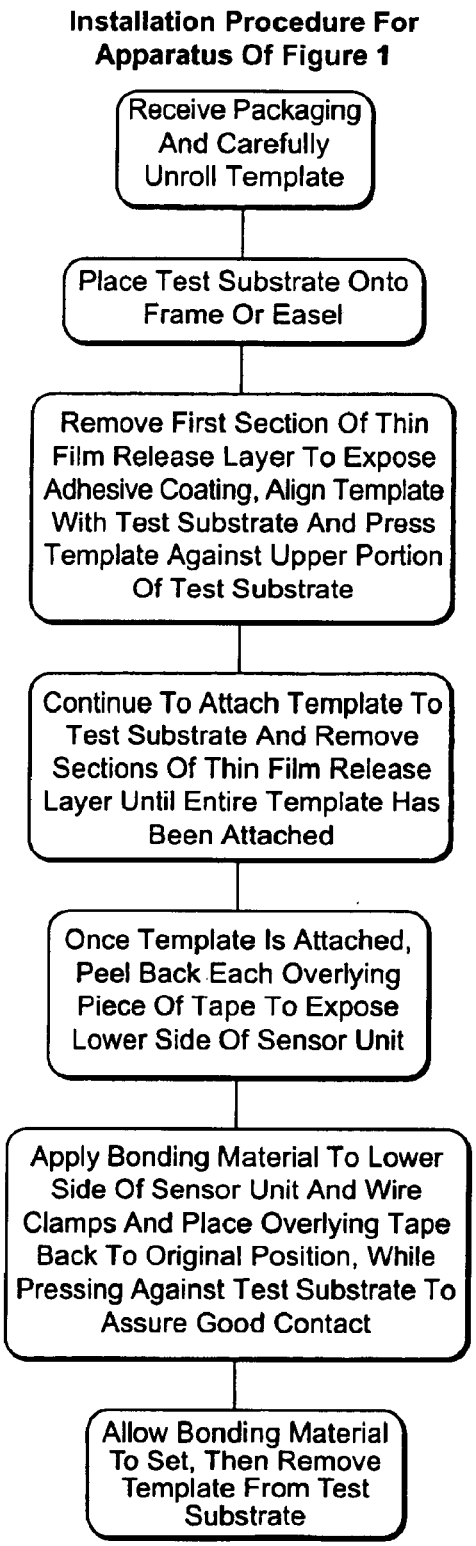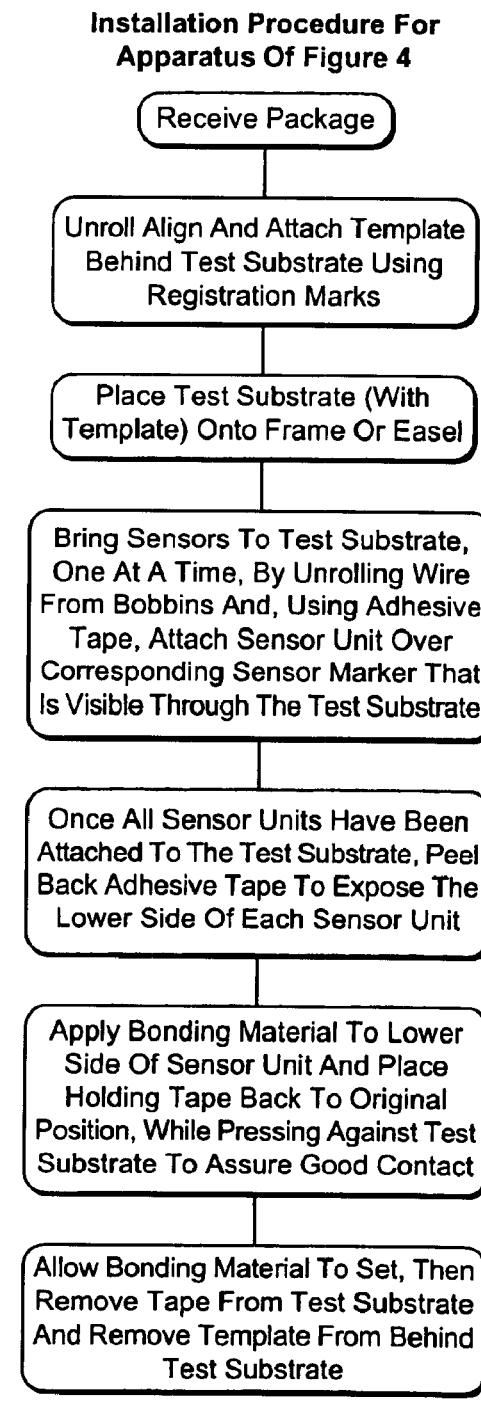
FIG._6
FIG._8

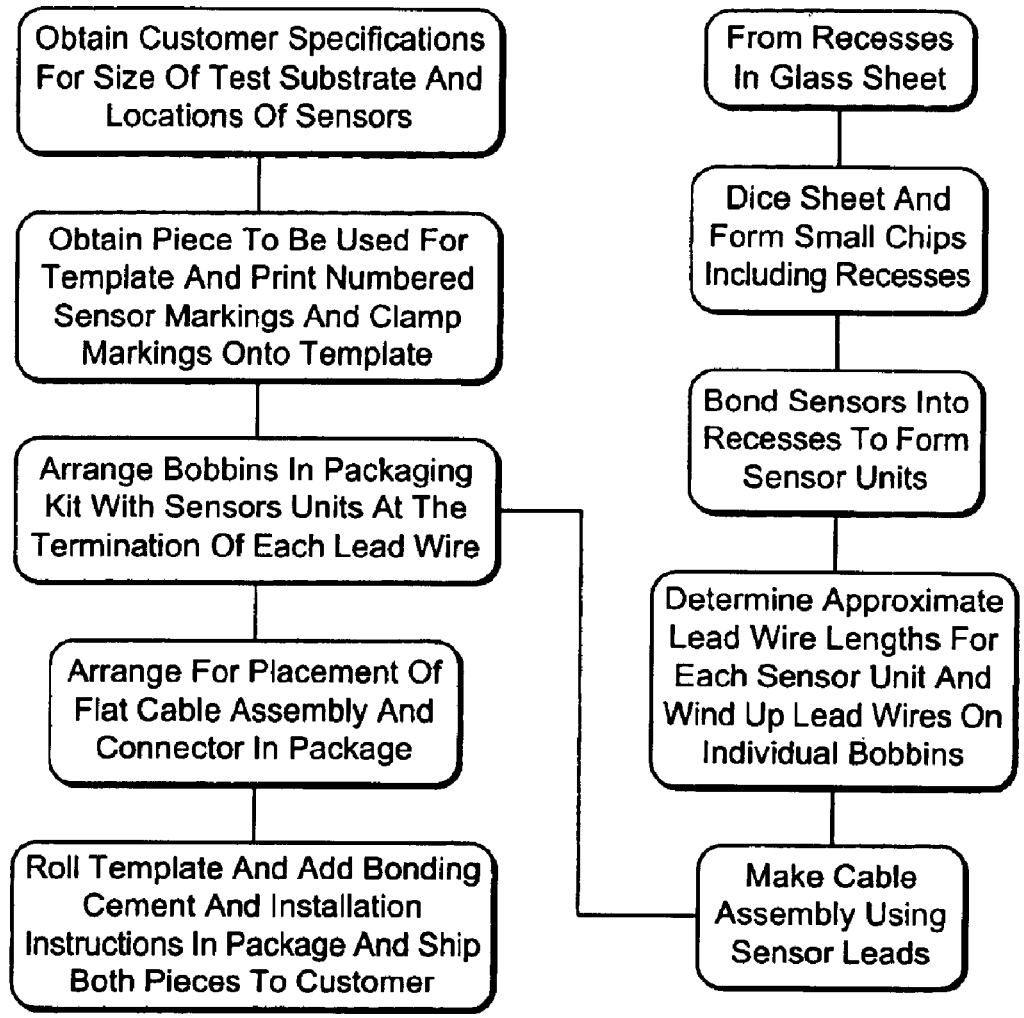
FIG._7

SENSOR POSITIONING SYSTEMS AND METHODS

BACKGROUND OF THE INVENTION

The present invention relates to positioning sensors with respect to substrates such as flat panel display glass substrates.

Processing of substrates, such as flat panel display (FPD) substrates, printed circuit boards (PCBs) or silicon wafers, involves subjecting substrates to various process conditions such as high temperatures, radio frequency (rf) plasma, chemical etching and ion bombardment. To produce good quality and high yield products, these process conditions must be maintained to a very high degree of uniformity across the surface of the substrate. Modem flat panel display substrates are large thin sheets of glass. Such large substrates make uniformity particularly difficult to maintain. In order to obtain good uniformity, process conditions must be measured to determine the variation across a substrate so that the variation may be reduced. For example, the temperature at different points on a substrate may need to be known in order to adjust process conditions to achieve better temperature uniformity. One way to measure such conditions is by using a substrate that has sensors attached to it.

Sensors may be mounted to a substrate to form an instrumented substrate that provides data on process conditions. Several sensors may be distributed on one or more surfaces of the substrate, or in recesses within the substrate, to create an array of sensors that monitors process conditions at various points. Such arrays of sensors are described by Renken et al., in U.S. Pat. No. 6,325,536, which patent is herein incorporated by reference in its entirety. Process conditions such as temperature, pressure, gas flow rates, chemical concentration, ion current density, position and acceleration may be monitored using such an array of sensors. Sensors may also be used for accurately measuring the physical location and orientation of a substrate.

Sensors may be placed in recesses in the surface of a substrate and cemented in place. This provides a strong attachment to the substrate. For example a temperature sensor may be embedded in this manner to ensure a strong attachment and good thermal contact with the substrate. Cement, or potting compound, may be used to retain the sensor in the recess and to provide good thermal contact with the substrate. Attaching a sensor in this manner is generally done in a dedicated facility by trained technicians. A substrate may be sent to such a facility by a customer to be instrumented in this manner. The recesses are created and the sensors embedded at the facility. Then, the instrumented substrate is sent back to the customer. For smaller substrates such as silicon wafers, an instrumented substrate may simply be shipped to a customer by regular mail or courier. However, FPD substrates are large and fragile and require special packaging and handling.

FPD substrates are rectangular with dimensions that may be greater than 2 meters. However, they are generally 1 millimeter thick or less. They are made of glass, which is brittle and is extremely fragile. This makes shipping difficult and expensive. Typically, a substrate is protected with impact resistant packaging material and is then enclosed within a shipping container such as a wooden crate. Even with such precautions, FPD substrates may be damaged in transit. After the substrate is instrumented with sensors at the facility and returned to the user, it is individually packaged with specially designed container. Transporting such large substrates may also be costly and time consuming, especially where international shipping is required.

SUMMARY OF THE INVENTION

A sensor positioning system uses a template to establish the locations of sensor units being attached to a substrate. Such a template may be formed with cutouts in the desired locations of a flexible film of desired size to hold sensor units. Senor units may be inserted in the cutouts and held in place by adhesive tape. A cable assembly connecting to the sensor units may be run to an appropriate connector. An adhesive layer on the bottom surface of such a template allows it to be stuck to the substrate surface. A release layer protects the adhesive layer until it is used. When the template is aligned to a substrate and stuck in position, sensor units are individually bonded in place. Then, the template is removed. Such a system may be assembled and tested in a dedicated facility by trained technicians. It may then be rolled up and shipped easily. Using such a system to instrument a substrate does not require specialized skills or tools and may be done in a short time. The system allows a customer to instrument a substrate on-site without the cost, delays or risk of shipping a substrate.

Another sensor positioning system uses visual alignment of sensor units to markings on a template. The template is placed behind the substrate where the markings are clearly visible through the substrate. A sensor kit contains sensor units with sensor leads wound around bobbins for shipping. Individual markings on the template identify individual sensor units so that each sensor unit may be placed at its predetermined location. Sensor units may be temporarily held in position until all the sensor units are positioned. Then, sensor units are individually bonded in position.

Sensor units include sensors embedded in a chip of material and cemented in place. The chip material used may be the same material as the substrate or something similar to it. Embedding sensors in a chip means that it is not necessary to embed sensors in the substrate. Thus, the sensor units may be surface mounted to a substrate without the need to form recesses in the substrate. Sensor units may include recesses of different shapes including rectangular, circular and spiral shapes.

BRIEF DESCRIPTION OF THE DRAWINGS

FIG. 1A shows a sensor positioning system that uses a template having cutouts to position individual sensor units.

FIG. 1B shows a sensor positioning system having wire clamps for one sensor lead or shared by multiple sensor leads, and having multiple sections of release film.

FIG. 1C shows a sensor unit within a cutout in a template in detail.

FIG. 2A shows a cross section of a sensor unit attached to a template.

FIG. 2B shows a sensor unit with bonding material applied.

FIG. 2C shows a sensor unit being bonded to a substrate.

FIG. 2D shows a sensor unit and substrate after template removal.

FIG. 3A shows a sensor unit having a rectangular recess.

FIG. 3B shows a sensor unit having a circular recess.

FIG. 3C shows a sensor unit having a spiral recess.

FIG. 4 shows a sensor positioning system using visual alignment of sensor units.

FIG. 5 shows a flowchart for fabrication of a system shown in FIGS. 1A and 1B.

FIG. 6 shows a flowchart for installation of an apparatus shown in FIGS. 1A and 1B.

FIG. 7 shows a flowchart for fabrication of a system shown in FIG. 4.

FIG. 8 shows a flowchart for installation of the apparatus of FIG. 4.

DETAILED DESCRIPTION

FIG. 1 shows one embodiment of a sensor positioning system 1 used to position sensor units 20a–20j on an FPD substrate (not shown). A template 10 is provided that is made of a thin sheet of a material. The material of template 10 can be a plastic or rubber material, for example Silicone, Mylar, polyethylene, polypropylene, polyester or Teflon. Template 10 may be flexible, thin and lightweight and should be particle free and non-contaminating. Template 10 may be transparent and may be colorless or may be colored so that it is easier to see for alignment. The dimensions of template 10 are selected to match the dimensions of a substrate that is to be instrumented. In this example, template 10 has the dimensions of an FPD substrate. However, in other examples, template 10 could have other dimensions. For example, a round template with a diameter of 300 mm could be used for 300 mm silicon substrates. One advantage of a thin flexible template is that it can be rolled up and may be easily transported in this rolled up configuration. Also, such materials are not easily damaged in transit.

An aligning bracket 11 is provided to position template 10 with respect to a substrate. Bracket 11 is a solid part that provides a right angle to align a corner of template 10 with a corner of a substrate. Precise positioning of the sensors is desired and this depends on precisely aligning the template to the substrate. Aligning bracket 11 is simple to use and can provide the required level of alignment (less than 1 mm of error). Alignment may also be done by visually aligning template 10 with a substrate.

Template 10 is coated with an adhesive coating 12 on one side. Adhesive coating 12 is comprised of an adhesive material that allows template 10 to be easily unstuck from a surface. Adhesive coating 12 does not form a permanent bond to a surface. It provides a tacky coating so that once adhesive coating 12 is pressed in contact with a smooth flat surface, template 10 does not slide across that surface. Adhesive coating 12 does not significantly adhere to sensor leads such as sensor lead 30a. However, template 10 may still be removed easily by pulling in a direction perpendicular to the surface. Adhesive coating 12 does not leave significant material on the surface it contacts. Thus, a substrate that is contacted by adhesive coating 12 remains clean and does not have significant residue from adhesive coating 12. An example of an adhesive that may be used for adhesive coating 12 is T-release made by Fralock. Template 10 is formed from a continuous sheet of material having a few cutouts such as 21a–21j for positioning. However, a template may also have openings other than those for positioning. Additional openings may be provided to reduce the weight of the substrate. Openings also prevent the formation of air bubbles during application of the template. Adhesive coating 12 may extend across the entire surface of template 10 or may cover portions of the surface forming tacky spots that hold template 10 in place.

Release layer 15 covers adhesive coating 12. Release layer 15 may be a plastic film. Release layer 15 protects adhesive coating 12 until it is used to adhere template 10 to a surface. Release layer 15 is easily removed. FIG. 1A shows a portion 6 of release layer 15 being peeled back from template 10. Adhesive coating 12 is exposed where portion 6 of release layer 15 is peeled back. Release layer 15 may be peeled back by hand. Alternatively, a release layer tool may be used to remove release layer 15. An example of such a tool is a roller that rolls up release layer 15 as the roller is rolled along the surface of template 10.

The configuration of sensor units 20a–20j is described with respect to an exemplary sensor unit 20a. Cutout 21a extends through template 10. Cutout 21a is made to accommodate sensor unit 20a so that the position of the sensor unit 20a is accurately established with respect to template 10. There may be a gap between the edges of cutout 21a and sensor unit 20a. However, the gap is generally small (less than 1 mm) so that the position of sensor unit 20a is tightly constrained within cutout 21a.

Tape 25a keeps sensor unit 20a within cutout 21a. Tape 25a is on the opposite side of template 10 from adhesive coating 12. Tape 25a overlies sensor unit 20a and portions of the surface of template 10 that are opposite adhesive coating 12.

Sensor lead 30a extends from sensor unit 20a, through template clamp 40 and flat cable assembly 50, to connector 60. Sensor lead 30a consists of electrically insulated, flexible wire. Template clamp 40 is located within a cutout in template 10 and has a surface that is flat to allow it to be attached to a substrate surface. Template clamp 40 may be attached to a substrate, thus holding sensor lead 30a so that sensor lead 30a runs along the surface of a substrate and does not become kinked or snagged when the substrate is moved. Template clamp 40 also provides strain relief for sensor leads 30. Sensor lead 30a passes through template clamp 40 and flat cable assembly 50 to connector 60. Any tension in sensor lead 30a caused by flat cable assembly 50 or connector 60 is taken by template clamp 40, not by sensor unit 20a. This may be important where sensor units comprise relatively delicate structures. Template clamp 40 has a large flat surface so that good adhesion to a substrate is possible. Flat cable assembly 50 allows sensor leads 30 to pass from a process chamber to a connector that is external to the process chamber even where there is a large pressure difference between process chamber and the exterior (e.g. where process chamber is under vacuum). Sensor lead 30a may be made up of multiple wires. The number of wires in sensor lead 30a depends on the type of sensor unit 20a. Typically, sensor lead 30a has two wires.

Wire clamp 19a is between sensor unit 20a and template clamp 40. Wire clamp 19a attaches sensor lead 30a to a substrate so that sensor lead 30a runs along the surface of the substrate where it is less likely to be damaged or become tangled or kinked. FIG. 1A shows an individual wire clamp between each of sensor units 20a–20j and template clamp 40. Wire clamp 19a may consist of a chip of material with a channel in it. A sensor lead is bonded into the channel. The chip has at least one flat surface that may be bonded to a substrate surface.

FIG. 1B shows a sensor positioning system 2 in which wire clamps are shared by multiple sensor leads. For example, clamp 19c is shared by sensor leads 30c and 30d. This is an alternative to the individual wire clamps for each lead shown in FIG. 1A. However not all wire clamps in FIG. 1B are shared. For example, clamp 19a is only attached to sensor lead 30a. In the embodiment of FIG. 1B, the sensor positioning system 2 includes a release layer that is made up of sections 16–18. This allows a portion of template 10 to be aligned and adhered first. Thus, section 16 of release layer 15 could be removed first and a portion of template 10 could be adhered before section 17 is removed.

FIG. 1C shows a more detailed view of the configuration of exemplary sensor unit 20a within cutout 21a. The dotted line shows the outer perimeter of cutout 21a. Sensor unit 20a is located within cutout 21a and is held in place by adhesive tape 25a. Sensor lead 30a extends from sensor unit 20a.

FIG. 2A shows a cross-sectional view of sensor unit 20a and portions of template 10 on substrate 90. FIG. 2A shows template 10 after alignment of template 10 to substrate 90. Template 10 is adhered to substrate 90 by adhesive coating 12. Release layer 15 has been removed at this point so that adhesive coating 12 is in direct contact with substrate 90.

Sensor unit 20a includes a sensor 22a and chip 26a. Sensor 22a is cemented into a recess 24a in chip 26a so that there is good thermal contact between sensor 22a and chip 26a. Sensor lead 30a extends from sensor unit 20a between substrate 90 and template 10. Chip 26a may be made from a variety of materials based on the desired properties. Here, sensor 22a is a temperature sensor, so thermal properties are important. In order to provide an accurate measurement of the temperature of the substrate, it is desirable to have the thermal properties of chip 26a close to those of substrate 90. This is especially true where radiant heating is used and where the use of materials with different emissivities could affect heating and thus affect temperature readings. Therefore, chip 26a may be made of the same material as substrate 90. Where conductive heating is used, it may be desirable to make a chip from a material that has a higher thermal conductivity than the substrate material in order to minimize temperature differences between the substrate and the chip.

Overlying sensor unit 20a and portions of template 10 is an adhesive tape 25a. Adhesive tape 25a holds sensor unit 20a in place within cutout 21a. Adhesive tape 25a is easily removable from both template 10 and sensor unit 20a. Alternatively, sensor unit 20a may be held in position by a mechanism such as a clip.

Sensor unit 20a is shown having a gap around it separating sensor unit 20a from the sides of cutout 21a. In practice, this gap is very small (one millimeter or less). The size of the gap is determined by the relative size of cutout 21a compared to sensor unit 20a. It is desirable to keep the gap small so that the position of sensor unit 20a is established with a high degree of precision. The location of an individual sensor 20a is important because the reading from sensor 20a may be used by a software program to model values at other points. For example, temperature sensors located at known points on a substrate surface may be used to give a temperature map for the whole substrate by interpolation. Temperature uniformity values may also be obtained from analysis of the distribution of temperature readings. However, for such analysis to be accurate the positions of the sensors are important This is especially true close to the edge of the substrate where there may be greater temperature differentials. The position of an individual sensor unit is determined by the position of the cutout that contains the sensor unit and the alignment of the template that contains the cutout. When a template is accurately aligned to a substrate, a sensor unit may be positioned to within +/−1 millimeter.

FIG. 2B shows sensor unit 20a in a raised position so that is clear of cutout 21a. Sensor unit 20a may be raised by lifting adhesive tape 25a from template 10 and peeling back adhesive tape 25a from the end that is away from sensor lead 30a Sensor lead 30a remains attached to sensor unit 20a so sensor unit 20a may not be completely removed from template 10. However, sensor lead 30a has sufficient slack to allow sensor unit 20a to be rotated from a horizontal position to a point where the lower surface 29a of sensor unit 20a is exposed. When lower surface 29a is exposed, a bonding material 27 is applied to it. Bonding material 27 may be a liquid cured to a solid. Ceramic cement may be used for temperatures above 400 degrees Centigrade, epoxy for low temperatures and silicone for mid-range temperatures of less than 300 degrees Centigrade. Bonding material 27 may be provided as part of a sensor positioning kit. Alternatively, a pressure sensitive double-sided adhesive tape may be used. The double-sided tape is covered by release layer 15 until release layer 15 is removed. Double-sided tape is limited to operating temperatures of less than about 250 degrees Centigrade.

FIG. 2C shows sensor unit 20a after bonding to substrate 90. The bonding step involves replacing sensor unit 20a within cutout 21 a and pressing sensor unit 20a against substrate 90. Having an adequate gap between sensor unit 20a and cutout 21a facilitates lifting and replacing sensor unit 20a. An inadequate gap makes manipulation difficult and may result in sensor unit 20a being bonded incorrectly. For example, sensor unit 20a may not be pushed to be in good contact with substrate 90 if a portion of template 10 is caught under part of sensor unit 20a. A colored surface may be placed behind substrate 90 during positioning of template 10 and bonding. A dark colored surface (e.g. dark blue) provides a background that makes it easier to see bubbles formed between template 10 and substrate 90 and also makes it easier to see bonding material 27. Obtaining good contact between sensor unit 20a and substrate 90 requires that bonding material 27 be a good thermal conductor and that the layer of bonding material 27 between sensor unit 20a and substrate 90 be thin. To obtain accurate results from sensor units 20a–20j, it is desirable that individual sensor units 20a–20j are separated from substrate 90 by a similar thickness of bonding material 27. In order to achieve this, particles of uniform size may be introduced into the bonding material. The thickness of bonding material 27 may be established by the particles in bonding material 27. Bonding material 27 is generally cured for a period of time (e.g. 30 minutes) before it forms a strong bond. When bonding material 27 is fully cured then template 10 may be removed. Template 10 may be peeled back from substrate 90 to leave sensor units 20a–20j attached to substrate 90.

FIG. 2D shows sensor unit 20a and substrate 90 after removal of template 10 and adhesive tape 25a. Sensor unit 20a is bonded to substrate 90 by bonding material 27 so that there is good thermal conduction and the temperature of sensor unit 20a remains very close to the temperature of substrate 90 even during rapid temperature change. Bonding material 27 may be three bond, rescore 905 or similar commercially available bonding materials. Having a bonding material with high thermal conductivity reduces the variation in temperature readings caused by variation in bonding thickness. One way to achieve high thermal conductivity is to add a material that has high thermal conductivity to a bonding material. Examples of such a material are diamond powder, silver or aluminum powder. Sensor 22a is cemented in recess 24a so that sensor 22a accurately measures the temperature of chip 26a and substrate 90. A portion of sensor lead 30a is also cemented in recess 24a.

FIG. 3A shows sensor unit 20a in more detail. The perspective in FIGS. 3A is at 90 degrees from that of FIG. 2D. The perspective in 3A corresponds to a view from below in FIG. 2D. FIG. 3A shows recess 24a in chip 26a. Recess 24a extends from one end of chip 26a, in a straight line, to near the opposite end of chip 26a. Recess 24a is open at one end and is open along the bottom of chip 26a. Sensor 22a and a portion of sensor lead 30a are located so that sensor 22a is within recess 24a and a portion of sensor lead 30a remains in recess 24a. Recess 24a is filled with cement so that sensor 22a and the portion of sensor lead 30a within recess 24a are bonded to chip 26a. There is a thin layer of cement between the sensor and the lower surface of the sensor unit 22a so that good thermal coupling is maintained between a substrate and sensor 22a. Thus, sensor 22a is surrounded by cement, which in turn is surrounded by chip 26a, except below and in the direction of sensor lead 30a. When sensor unit 20a is bonded to a substrate as shown in FIG. 2D, the bottom of sensor unit 20a is covered by the substrate and recess 24a is enclosed in all directions except in the direction of sensor lead 30a Because recess 24a is not enclosed in the direction of sensor lead 30a, heat transfer in this direction may affect the accuracy of sensor 22a. Sensor lead 30a includes electrically conductive portions that may also provide good heat conduction. Thus, it may be advantageous to keep a portion of sensor lead 30a cemented within recess 24a to reduce conduction of heat by sensor lead 30a. Cementing a portion of sensor lead 30a also provides a strong mechanical connection so that sensor lead 30a and sensor 22a do not easily separate from chip 26a.

FIG. 3B shows an alternative sensor unit 120. In this example, a circular recess 124 in chip 126 is provided. Sensor 122 is at one side of circular recess 124 and portions of sensor lead 130 extend from sensor 122 on either side of circular recess 124 and extend outward from circular recess 124 opposite sensor 122. This configuration provides increased mechanical strength and thermal conduction between sensor 122, sensor lead 130 and chip 126.

FIG. 3C shows another sensor unit 220. In this example, a spiral recess 224 in chip 226 is provided. Sensor 222 is located at or near the center of spiral recess 224. Sensor lead 230 extends from sensor 222 within spiral recess 224 and extends from sensor unit 220. The spiral configuration may retain a longer portion of sensor lead 230 within spiral groove 224 than the configurations shown in FIG. 3A and 3B. This configuration has two advantages. Firstly, it provides improved mechanical strength for the bond between sensor lead 230 and chip 226. Secondly, it reduces the heat transfer effect of sensor lead 230 on sensor 222.

Sensor units 20a, 120 and 220 shown in FIGS. 3A–3C are alternative configurations that are principally used for temperature sensing. Sensors 22a, 122 and 222 may be thermocouples, thermistors, RTDs or other temperature sensors. However, sensors other than temperature sensors may also be used. Possible sensors include pressure sensors, gas flow rate sensors, humidity sensors and radiation dose sensors. Sensor units may be adapted to the process variable that they measure. Sensor units for various applications may be formed using a uniform chip size. A chip of uniform size and shape is well adapted to use with a template because cutouts in a template may then be of uniform size and production of both templates and chips may be automated. Also, having a sensor embedded in a chip provides some protection for the sensor and for the sensor lead that attaches to the sensor. A chip provides uniform attachment between sensors and the substrate. This may give more accurate measurements. Sensors of different types may be used in an array so that, for example, both temperature and pressure are measured by the same array. A single chip may contain more than one sensor so that an individual sensor unit may measure more than one process condition.

FIG. 4 shows a sensor positioning system 403 employing visual alignment of sensor units. Substrate 490 is being instrumented in FIG. 4. Substrate 490 is placed in a position that provides access to the front surface 491 of substrate 490 that is to be instrumented. A template 410 is placed against the opposite surface 492 of substrate 490. Template 410 has visible markings on its surface. Template 410 may simply be a sheet of paper that is the same size as substrate 490. Template 10 may be rolled up or folded for transportation. Template 410 may be aligned to substrate 490 using an alignment tool or by visually aligning a corner of template 410 with a corner of substrate 490. Visible markings are located at positions on the surface of template 410 that correspond to the desired positions of sensor units on substrate 490. The markings may be simply darkened areas on a white surface. FIG. 4 shows one such marking 470a. Substrate 490 is a glass FPD substrate. Thus, marking 470a may be seen through substrate 490.

As part of sensor positioning system 403, a sensor kit 411 is provided that includes sensor leads 430. Sensor leads 430 run together from connector 460, through flat cable assembly 450 and through template clamp 440. From template clamp 440, sensor leads 430 extend separately to bobbins 480. Sensor leads 430 are individually wound around bobbins 480. Sensor leads 430 terminate at sensor units (not shown).

To use sensor positioning system 403 to instrument a substrate, template 410 is first aligned as described above. An individual sensor lead 430a is selected and is unwound from its corresponding bobbin. Sensor lead 430a terminates at sensor unit 420a. The correct alignment mark 470a is located on template 410. Sensor unit 420a is aligned to alignment mark 470a and is taped in position using an adhesive tape. This is repeated for sensor leads 430 until all sensor units are in position. Template clamp 440 is also aligned to a corresponding alignment mark on template 410 and taped in position. Ensuring that sensor units are positioned accurately to their corresponding alignment marks and are not mixed up is important to accurately analyze any data collected. Also, it is important that the sensors units are accurately placed with respect to their alignment mark. Either swapping sensors or inaccurately positioning sensors may cause errors in calculations based on sensor readings. An alignment mark 470a and a sensor unit 420a may be numbered or marked in some way to show that they correspond to each other. Sensor leads 430 may be trimmed to the correct length so that sensor units may not easily be misplaced. However, it is important that sensor leads 430 have sufficient slack to allow for thermal expansion of substrate 410 during beating. To facilitate this, sensor leads 430 may be wound into loops to keep sensor leads 430 from hanging loosely from substrate 410 while providing some slack.

When the sensor units and template clamp 440 are positioned correctly they may be bonded in position in a process that is similar to the process described with respect to FIGS. 2A–2D above. An individual sensor unit 420a is lifted from substrate 490 by peeling back the adhesive tape holding it in position. Bonding material is applied to the bottom of the sensor unit 420a and sensor unit 420a is repositioned and pressed in place. The bonding material is allowed to cure and then the adhesive tape is removed. Template clamp 440 is also bonded in place in this manner. Additional wire clamps may also be bonded to substrate 490 to ensure that sensor leads 430 do not hang loose from substrate 490.

FIGS. 5–6 give a flowchart of the process of fabricating and installing the systems shown in FIGS. 1A and 1B. FIGS. 7–8 give a flowchart of the process of fabricating and installing the system shown in FIG. 4.

Although the various aspects of the present invention have been described with respect to certain specific illustrative embodiments thereof, it will be understood that the invention is entitled to protection within the full scope of the appended claims.

What is claimed is:

1. A sensor positioning system for holding sensor units in fixed relative locations in a detachable manner, comprising:
   a template having a first surface, a second surface that is parallel to the first surface and cutouts that extend from the first surface to the second surface;
   a plurality of sensor units, an individual sensor unit including at least one sensor;
   an individual sensor unit of the plurality of sensor units being retained within a cutout such that the location of the individual sensor unit is maintained with respect to the template;

a plurality of sensor leads, individual sensor leads connecting to individual sensor units; and the plurality of sensor units and the plurality of sensor leads being retained by the template in a detachable manner such that the plurality of sensor units and the plurality of sensor leads are fully detachable from the template permitting separation of the template from the plurality of sensor units and the plurality of sensor leads.

2. The sensor positioning system of claim 1 wherein an individual sensor unit comprises a chip of material in which a sensor is retained and wherein the material is chosen to be the material of a substrate to which the sensor unit may be attached or a material having higher thermal conductivity than the material of the substrate.

3. The sensor positioning system of claim 2 wherein the chip has a planar surface with a spiral shaped groove; and wherein the sensor and a portion of the sensor lead is inserted in the spiral shaped groove and is cemented in position.

4. The sensor positioning system of claim 1 further comprising an alignment tool that aligns the template to the substrate, the alignment tool and the template being separately movable.

5. The sensor positioning system of claim 1 wherein the first surface of the template is coated with an adhesive film to provide a continuous tacky surface.

6. The sensor positioning system of claim 5 further comprising a release layer applied to the tacky surface.

7. The sensor positioning system of claim 1 wherein portions of the first surface of the template are coated with an adhesive film to provide a tacky surface.

8. The sensor positioning system of claim 7 further comprising a release layer removal tool that rolls up the release layer to expose the tacky surface.

9. The sensor positioning system of claim 1 wherein the sensor unit is retained within the cutout by an adhesive tape that extends over the sensor unit and over a portion of the second surface of the template.

10. The sensor positioning system of claim 1 further comprising a lead clamp attached to one or more leads and that is configured to be attached to a substrate.

11. The sensor positioning system of claim 1 further comprising a flat cable assembly through which the plurality of sensor leads pass and a connector to which the plurality of sensor leads attach.

12. A method of positioning sensor units on a substrate surface at predetermined locations, comprising:

aligning a template to the substrate surface such that the template extends across the substrate surface and individual sensor units affixed to the template are positioned at predetermined locations that are specific to the individual sensor units;

detaching a sensor unit from the template;

subsequently attaching the sensor unit to the substrate surface at the predetermined location established by the template; and subsequently removing the template from the substrate, leaving the sensor unit attached to the substrate surface at the predetermined location.

13. The method of claim 12 wherein aligning a template to the substrate surface is by placing an alignment tool against a corner of the substrate and moving the template so that a corner of the template is against the alignment tool.

14. The method of claim 12 wherein detaching a sensor unit from the template is by peeling back an adhesive tape that is attached to the sensor unit and is also attached to a portion of the template so that with the tape peeled back, the sensor unit may be moved in relation to the template.

15. The method of claim 12 wherein attaching the sensor unit to the substrate surface is by adding a layer of bonding material between the sensor unit and the substrate surface.

16. The method of claim 15 wherein the bonding material is thermally conductive.

17. The method of claim 16 wherein the thermally conductive bonding material contains diamond powder.

18. The method of claim 16 wherein the thermally conductive bonding material contains silver powder.

19. The method of claim 12 wherein attaching the sensor unit to the substrate is by using a pressure sensitive adhesive.

20. A sensor positioning system for aligning sensor units to predetermined locations on a surface of a transparent substrate, comprising;

a template that has visible markings that represent the predetermined locations at which the sensor units are to be located;

the template being capable of being rolled or folded;

a sensor assembly, comprising:

a plurality of sensor units, sensor units individually comprising at least one sensor;

a plurality of sensor leads, an individual sensor lead attached to a sensor unit at one end and attached to a connector at the other end; and a lead clamp that is attached to the plurality of sensor leads and that is adapted to be attached to a substrate;

the sensor assembly and the template being physically separate.

21. The sensor positioning system of claim 20 further comprising a flat cable assembly through which the plurality of sensor leads passes.

22. The sensor positioning system of claim 20 wherein the sensor leads are retained by winding the sensor leads around bobbins prior to attachment to the substrate.

23. The sensor positioning system of claim 20 wherein the visible markings and the sensor units are individually identified to indicate which sensor unit corresponds to an individual predetermined location.

24. A method of positioning sensor units on a surface of a planar transparent substrate at predetermined locations comprising:

placing a template that has alignment marks against a first surface of the substrate such that the alignment marks are visible through the substrate;

visually aligning a sensor unit with a predetermined location indicated by alignment marks, the sensor unit having a sensor lead that extends through a cable assembly; and attaching the sensor unit to a second surface of the substrate at the predetermined location.

25. The method of claim 24 further comprising attaching a lead clamp to the second surface of the substrate, the lead clamp holding sensor leads that connect to individual sensor units.

26. The method of claim 24 further comprising extending sensor leads between the lead clamp and the sensor units from a coiled configuration to an extended configuration.

27. The method of claim 26 wherein the coiled configuration is maintained by coiling the sensor lead around a bobbin.

* * * * *